United States Patent [19]
Heisler

[11] 3,917,789
[45] Nov. 4, 1975

[54] METHOD FOR MOLDING A PLASTIC CONTAINER HAVING A MOLDED HANDLE PIVOTALLY RETAINED BY AN INTEGRALLY FORMED ATTACHMENT

[76] Inventor: Raymond A. Heisler, 657 Dakota Trail, Franklin Lakes, N.J. 07417

[22] Filed: Oct. 31, 1974

[21] Appl. No.: 519,688

Related U.S. Application Data

[62] Division of Ser. No. 333,500, Feb. 20, 1973, Pat. No. 3,861,840.

[52] U.S. Cl. ............... 264/219; 264/242; 264/250; 264/328
[51] Int. Cl.² ............................................ B29F 1/00
[58] Field of Search ........... 264/242, 328, 250, 254, 264/255, 318, 219, 220

[56] References Cited
UNITED STATES PATENTS
3,140,329   7/1964   Nutting .............................. 264/242

*Primary Examiner*—Robert F. White
*Assistant Examiner*—Willard E. Hoag
*Attorney, Agent, or Firm*—Ralph R. Roberts

[57] ABSTRACT

This invention pertains to a method of forming a molded container of plastic which as it is molded is formed with a pair of attachments and while the just molded container is still retained in the mold a pair of movable pins are moved outwardly to evacuate the molded attachment and uncover and provide a runner opening to the just formed attachment. Around these attachments and a connected second mold cavity a different plastic is injected which second cavity, when filled, forms a bail-like handle whose ends flow into and/or around the previously molded attachments formed on the container. The container is shown as molded by three different attachment methods. In a first attachment, the container has a socket into which the bail end is formed to provide a ball or button-like attachment. In a second embodiment, the container is molded with button-like protuberances and the handle is molded around the attachment with its ends flowing around these protuberances to provide pivoted mounting of the ends of the handle. In a third embodiment, the attachment on the container is a short pin around which the handle end is formed as a strap-like attachment. The container and attached bail are removed from the mold and the container includes a rotatably retained plastic bail-like handle.

14 Claims, 17 Drawing Figures

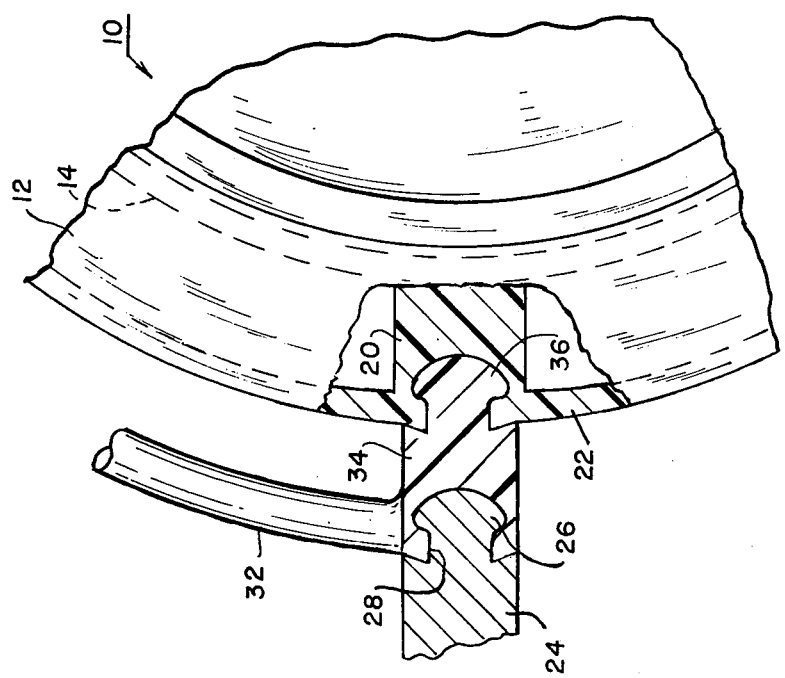
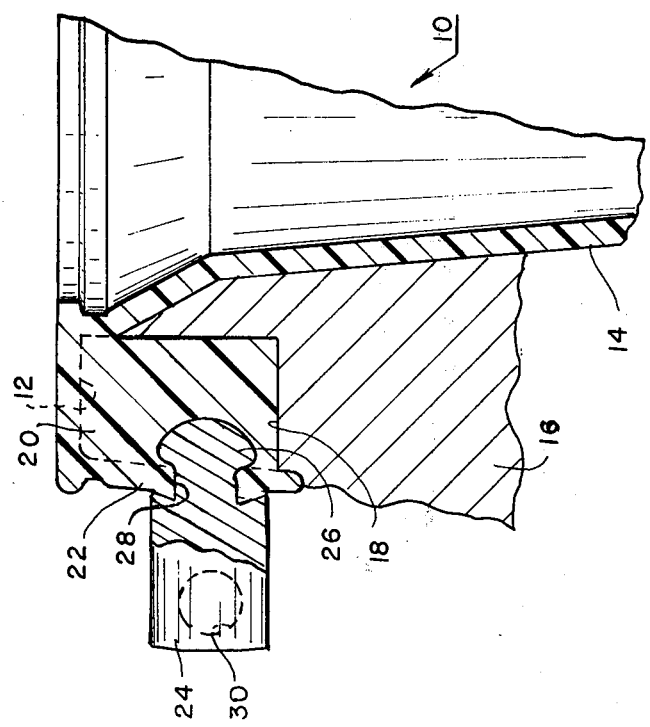

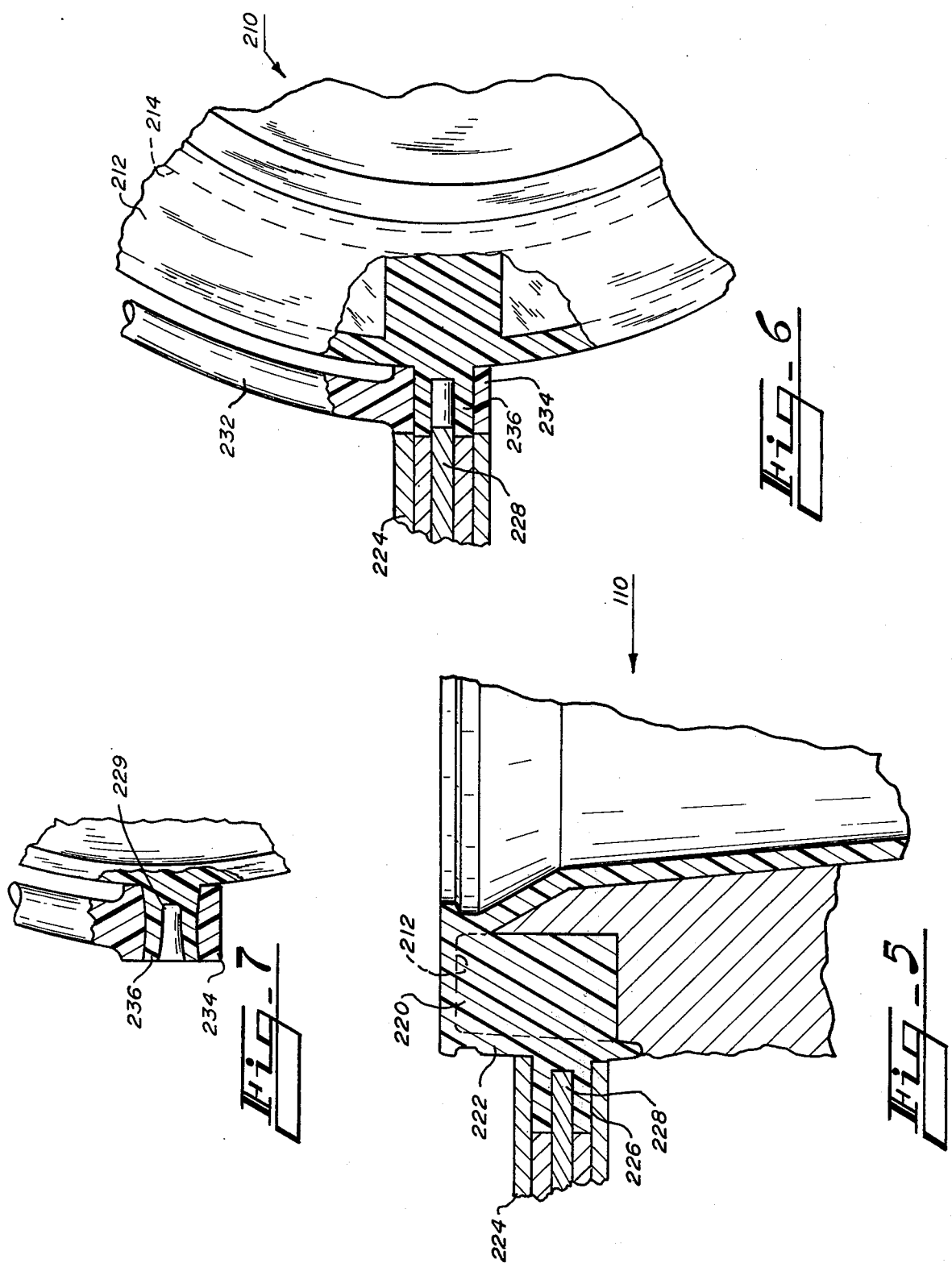

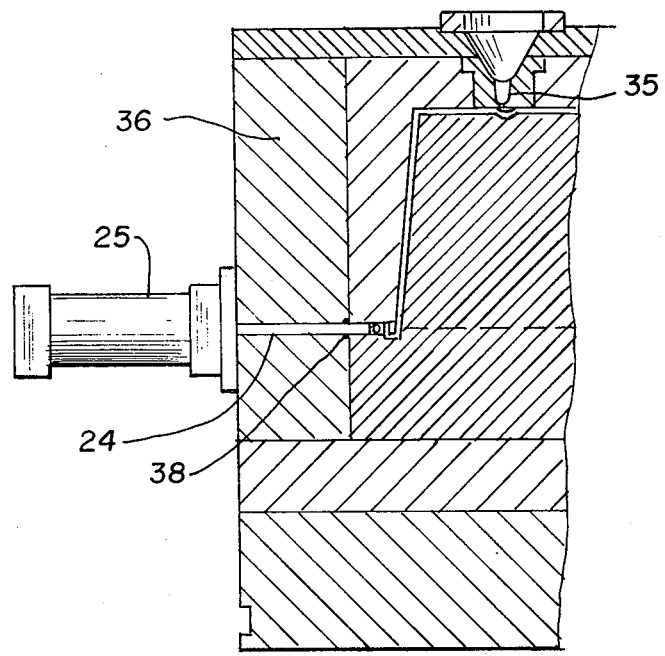
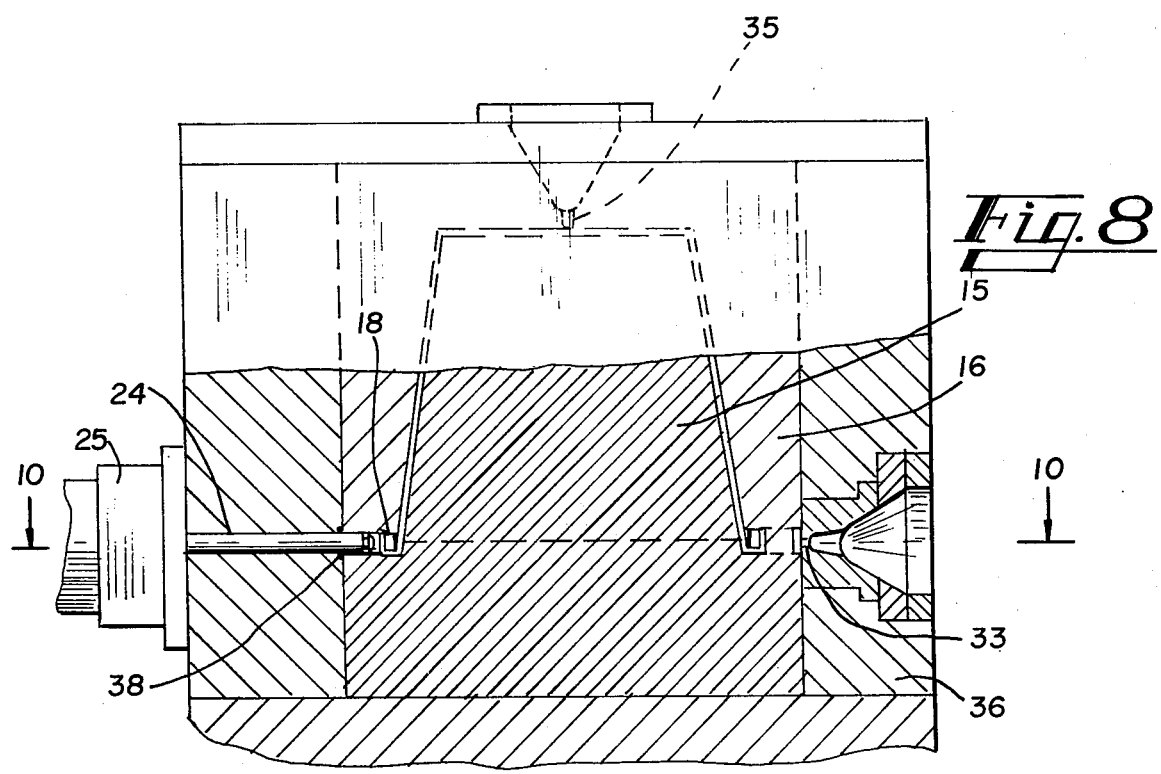

METHOD FOR MOLDING A PLASTIC CONTAINER HAVING A MOLDED HANDLE PIVOTALLY RETAINED BY AN INTEGRALLY FORMED ATTACHMENT

CROSS-REFERENCE TO RELATED APPLICATION

This application is a divisional application resulting from a restriction requirement of Mar. 5th, 1974 of U.S. Pat. application Ser. No. 333,500, filed Feb. 20th, 1973 now U.S. Pat. No. 3,861,840.

BACKGROUND OF THE INVENTION

1. Field of the Invention

With reference to the classification of art as established by the U.S. Pat. Office the present invention pertains to art as found in the Class entitled, "Plastic and Non-Metallic Article Shaping or Treating; Process" (Class 264) and more particularly to the subclass entitled, "with step of making mold or mold shaping per se" (subclass 219) and the further subclass of "utilizing surface to be reproduced as an impression pattern" (subclass 220).

2. Description of the Prior Art

Molded containers of plastic and having handles attached thereto are, of course, well known and in a great many instances the attached handle is made of wire or other metal. It is known to provide a plastic bail of strap-like configuration which is secured to the container by inserting the ends of the bail into ears or onto protruding buttons formed on the container so as to retain the ends of the handles to the previously molded containers. This means of retaining and mounting a bail requires additional manufacturing operations and in many cases where the bail is of plastic the strength and retention of the bail on the pail is oftentimes unsatisfactory. Where wire bails are used with plastic containers, the ends of the bails and the molded ears or recesses for receiving the ends of the bails usually require elaborate tooling and associated assembly costs.

The present invention pertaining to the method of molding a bailed container has the container and the bail handle molded and assembled in the same mold and absent further assembly operations. A first embodiment depicts the container formed with a molded outwardly extending retaining rim. As this container is molded a pair of slidable tool portions in the form of pins, while in a first position, form a pair of sockets as the container is molded. The molding is preferably injection molding but may include a blow molded container having formed protuberances to which the handle is attached. In these sockets the hub ends of the bail and the handle portion therebetween are molded of a different supply of plastic material with the ends of the bail pivotally retained in the sockets. After the handle is molded, the bailed plastic container is removed from the mold. In a second embodiment a reverse of the first embodiment is depicted. The slidable tool portions are formed with their inner ends having button-like cavities resulting in the molded container having attached button-like protuberances. While and after the slidable tool portions are moved to a second position to uncover these protuberances, the handle and hub ends are molded with their ends closing these button-like protuberances. After the bail is molded this bailed, plastic container is removed from the mold.

In a third embodiment the slidable tool portions form hollow, pin-like extending attachment portions. While and after the slidable tool portions are moved outwardly to their second position to uncover these attachment portions, the handle is molded with the hub ends enclosing these pins with and in a strap-like attachment. After the bail is molded this bailed, plastic container is removed from the mold.

SUMMARY OF THE INVENTION

A method of molding and forming a plastic container preferably includes a container having a rim portion in which is formed opposed attachments in the form of sockets, button-like or pin-like protuberant ends for retaining the ends of a plastic bail. These sockets or protuberant ends are formed by movable mold pins which are in a first position as the container is molded. Without removing the just formed container from the mold the socket or protuberant end forming mold pins are moved outwardly to a second position to open the sockets or uncover the protuberant ends and at the same time uncover a passageway to a bail molding cavity portion of the mold whose ends terminate at and with the formed sockets or in protuberant ends formed on the container. The bail is of a different plastic supply so that as and when molded the bail ends formed and retained in the sockets or on the protuberant ends on the molded container rim do not weld to the pail. These bail ends when solidified provide hubs which are pivotally retained in the sockets or on the protuberant ends extending from the side of the container. The socket or protuberant end forming pin members preferably have their ends shaped to form more-or-less spherical sockets or alternately the protuberant ends are shaped as button-like protuberances or pin-like extensions on the container. These pin members also close the outer end of the bail hub cavity and when moved outwardly to a third position are disengaged from the bail hub and may cause like recesses or protuberances to be formed in the outer facing surface of the end of the bail.

In addition to the above summary the following disclosure is detailed to insure adequacy and aid in understanding of the invention. This disclosure, however, is not intended to prejudice that purpose which is to cover each new inventive concept therein no matter how it may later be disguised by variations in form or additions of further improvements. For this reason there has been chosen a method of molding a plastic container in which a molded bail handle is pivotally retained by an integrally formed socket. In two alternate embodiments protuberant ends are formed, one being a button-like protuberance formed on the container with mating sockets formed on the ends of the bail handles. In the other alternate embodiment the protuberant ends are pin-like extensions from the container and a strap-like attachment is formed on each end of the bail and around these pin-like extensions. In the following detailed description a preferred method for molding the container and handle in two steps is described. This molding of the handle is achieved while retaining the container in the mold. This specific embodiment and two alternates thereof have been chosen for the purposes of illustration and description as shown in the accompanying drawings wherein:

BRIEF DESCRIPTION OF THE DRAWINGS

FIG. 1 represents a fragmentary side sectional view of a just-molded container and in particular the movable mold pin by which a socket is formed in the rim portion of the container;

FIG. 2 represents a fragmentary, partly diagrammatic plan view showing the molded container of FIG. 1 and in section the movable mold pin moved to its second condition with the bail now molded with its end pivotally retained in the socket formed by the moved inner end of the movable pin;

FIG. 5 represents a fragmentary side sectional view of an alternate just-molded container and in particular the relationship of the container to the movable mold pin by which this container is provided with a pair of pin-like protuberant attachments;

FIG. 6 represents a fragmentary partly-diagrammatic plan view showing the molded container of FIG. 5 and in section the movable mold pin moved to its second condition with the bail now molded, the shrinkage of the central portion of the hollow pin-like protuberant attachment providing a reduced diameter for retaining the strap-like ends of the bail;

FIG. 7 represents a fragmentary enlarged sectional view of the bail end mounted on the pin-like protuberant attachment as formed on the container;

FIG. 8 represents a partly diagrammatic sectional view showing a mold arrangement whereby the container of the present invention may be molded, this view taken on the line 8—8 of FIG. 10 and looking in the direction of the arrows;

FIG. 9 represents in a slightly enlarged view the means for actuating a movable mold pin;

In the following description and in the claims various details will be identified by specific names for convenience; these names, however, are intended to be generic in their application. Corresponding reference characters refer to like members throughout the several figures of the drawings.

Figure 4:
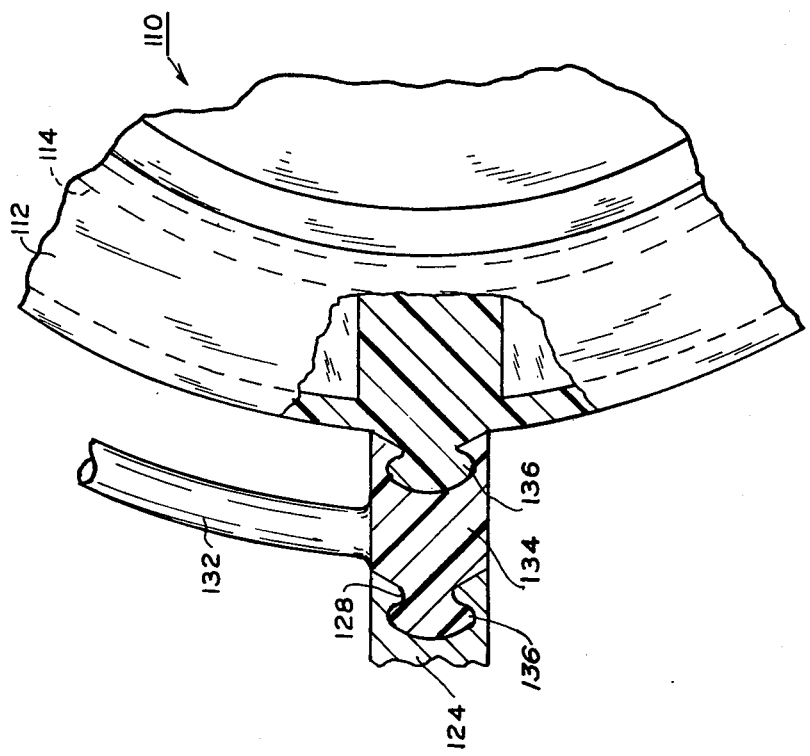
FIG. 4 represents a fragmentary, partly diagrammatic, plan view showing the molded container of FIG. 3 and in section the movable mold pin moved to its second condition with the bail now molded and with its end pivotally retained on the button-like protuberance formed by the moved inner end of the movable pin.

The drawings accompanying and forming part of, this specification disclose pertinent details for the purpose of expanation of the invention, but it should be understood that these details may be modified and that the invention may be incorporated in other structural forms than shown.

DESCRIPTION OF THE PREFERRED EMBODIMENT OF FIGS. 1 AND 2

Referring now to the drawings and in particular to FIGS. 1 and 2, there is depicted a molded container 10 preferably having a reinforced outwardly extending rim portion 12 which is attached to a tapered side wall 14. An inner plug 15, as seen in FIG. 8, in combination with the female or outer portion 16 of the mold, when closed, provides the cavity into which the molten plastic for the container 10 is injected. Locally in the portion 16 is formed a recess portion 18 which, when filled, provides a block 20 of plastic. This block 20 extends inwardly from a downwardly extending skirt portion 22. The block may or may not extend to join the side wall 14 of the container, this being merely a matter of design selection as used hereinafter "inner" and "inwardly" mean toward and "outwardly" mean in a direction away from the center of the mold as shown in FIG. 10.

A pin member 24 is slidably mounted in a close fitting guideway in the mold 16 and is selectively movable to three positions of movement by a hydraulic cylinder 25, as in FIGS. 8 and 9, or by a cam action. In its inner movement and limit the pin member 24 causes its inner end which is shown as an ellipsoid end 26 to be positioned inward of the inner edge of skirt 22. A reduced shoulder portion 28 in the pin is contemplated to be circular and concentric with the ellipsoid end 26. As shown, this reduced portion 28 in the pin produces a conical outwardly directed portion in the skirt 22. After the container 10 and the included block portion 20 are initially molded the pin 24 is moved outwardly to the position of FIG. 2. In doing this, a mold passageway 30, shown in dashed outline in FIG. 1, is uncovered. This passageway, seen in plan view in FIGS. 10, 11 and 12, forms the ball-like handle cavity shown.

Figure 10:
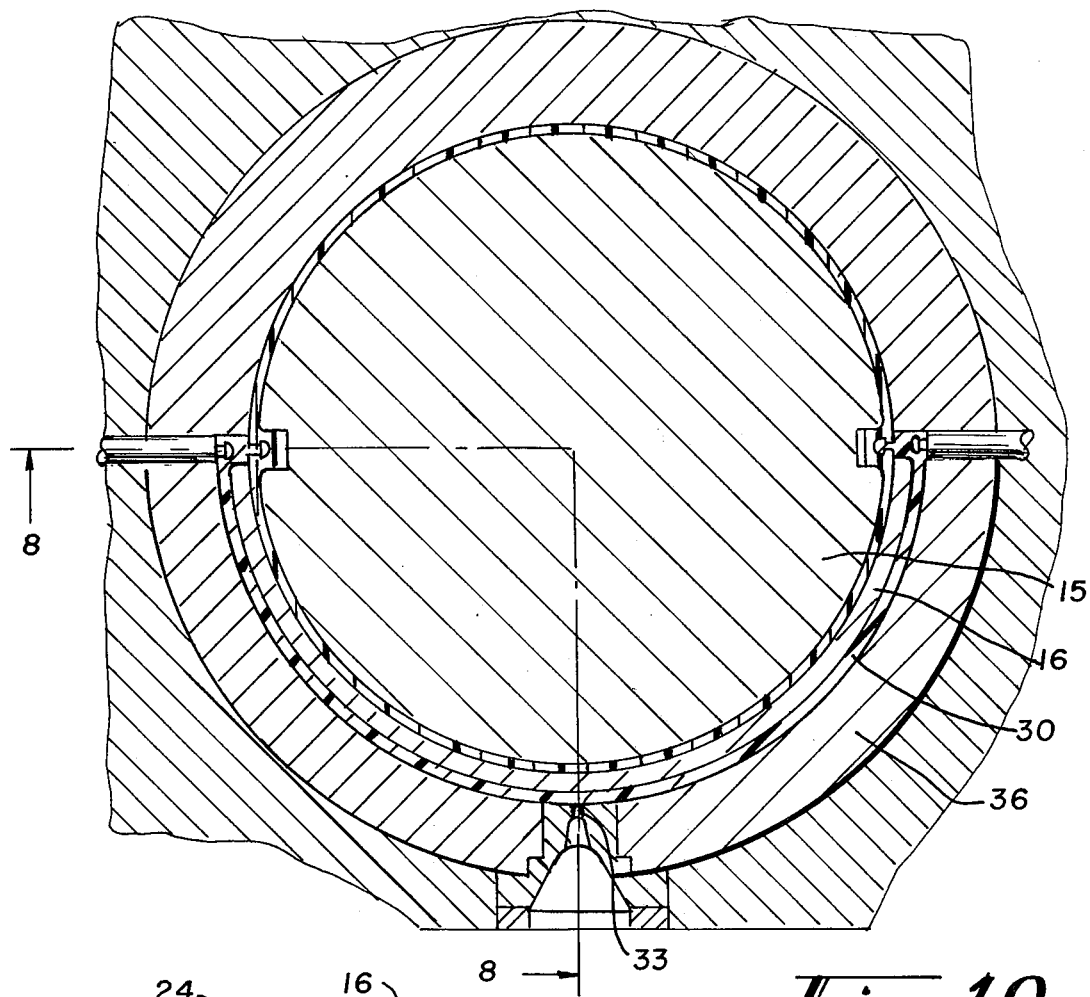
FIG. 10 represents a partly diagrammatic sectional plan view of the mold arrangement, this view taken on the line 10—10 of FIG. 8.
Figure 11:
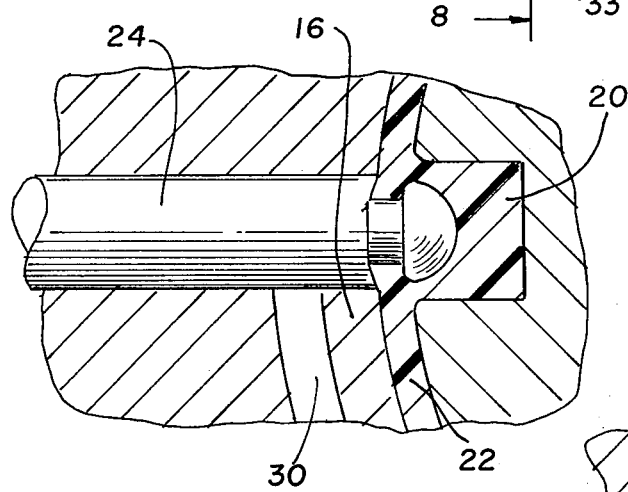
FIG. 11 represents a plan view of the molded pivot of FIG. 1.
Figure 12:
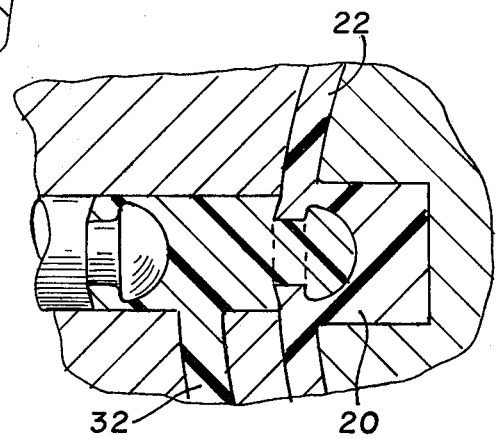
FIG. 12 represents a plan view of the molded pivot of FIG. 2.

With pin 24 now arranged in the mold 16, as in FIGS. 2, 10 and 12, and with the container 10 still in the mold, a plastic bail-like handle 32 of a different plastic is caused to flow in and through passageway 33 to the bail cavity 30. The ends of the bail flow through the terminal end of passageway 30 into that portion of mold 16 which has been evacuated by the outward movement of pin 24. This causes the bail-like handle 32 to have a heavy hub portion 34 which is of the size and configuration of pin 24, the hub having an inner ellipsoid end 36 which is formed in and by the cavity created by the outward withdrawal of pin 24. As a selected aesthetic appearance the outer face of the hub end has an outwardly extending conical construction conforming to the shape of the reduced portion 28 in the pin 24. To insure that the hub end 36 is not welded or otherwise attached to the cavity of plastic in which it is received it is contemplated that that material from which the molded container is made is not compatible with the plastic from which the bail-like handle is made. Prior to ejection of the container and attached handle, the pin 24 is further moved outwardly to its outer third position whereat the end 26 is removed from the molded bail hub 34. This, of course, leaves a corresponding recess in the hub 34 which may or may not be covered or filled by an auxiliary decorative piece not necessarily a part of this molding operation. If desired, a covering plug to partly fill the recess in the end of hub 34 may be molded as an attached part of handle 32. The appearance and shape of the hub and its outer facing end portion is merely a matter of selection.

As seen in FIGS. 8, 9 and 10, a container 10 is conventionally molded so that the molten plastic is fed through a sprue 35 into the bottom of the container. The bail handles of FIGS. 2, 4 and 6 must be molded so that their mid-thickness is more-or-less on the parting line between the inner plug 15 and the female outer portion 16. An outer chase portion 39 may be provided and in this chase is carried a side sprue 38 into which the injection nozzle of the second molten plastic source is fitted. The short sprue 33 is severed as the bail handle and the container are pushed by ejector pins from the core or inner plug 15. A sealing means such as an O-ring 38 may be used to prevent any flow of plastic up the passageway provided for pin member 24.

USE AND OPERATION

Although FIGS. 1 and 2 show only one side of the container 10 and a portion of the pivoted bail-like handle 32 it is, of course, to be realized that in a complete container 10 there are two like or similar sockets formed by like or similar pins 24. These pins and the corresponding sockets are diametrically disposed on the container 10 and the mold 16, as seen in FIG. 10. The bail-like handle 32 is pivotally secured at both its ends in these sockets.

It is contemplated that when the container 10 is molded, the mold is closed and pins 24 are in the position of FIG. 1. The molten plastic is fed through sprue 35 to the connecting container cavity and at this time block portion 20 and the ellipsoid button-like end 26 in this block form the receiving socket for the hub of the bail-like handle 32.

With the mold still closed and the molded container still retained therein, the pins 24 are moved outwardly from their inner position of FIG. 1 to the position of FIG. 2. The uncovering of mold passageway 30 and the rest of the bail-like handle cavity permits the bail 32 to be molded. This handle cavity is fed molten plastic preferably of another type and of a lower melting point and from another source and through sprue 33. The solidifying of this second source of plastic providing this bail-like handle in the mold permits the pins 24 to be further moved outwardly to release the bail from the pins. After the removal of the pins from hub portion 34 the mold is opened as to both pail and pivotally attached bail-like handle and as an assembled container is removed from the mold.

It is to be noted that pin 24 may be round or have other cross-sectional configurations. The ellipsoid shape of end 26 need not be provided but may be spherical or any other shape which permits rotational movement of the bail end in the molded socket. The block 20 which forms a socket housing may be of any configuration which provides the desired support and thickness for forming the socket. The shrinkage developed in molding the block 20 in relation to the rim wall portion of the container and also the container side wall may require some allowances to be accommodated depending on the material from which the container is made and the relative sizes of the parts of the container and bail.

Although it is anticipated that the preferred container on which the molded bail is mounted is an injection molded container that is not to say that the container 10 may not be a blow molded container which is shaped in a mold having the female portions provided with movable pins 24. Around the ends of pins 24 the sockets may be formed and then in the manner above described, the pins 24 are moved to enable the bail 32 to be molded with the handle ends 34 secured in these sockets.

The bail cavity 30 and bail 32, seen in FIGS. 8 through 12, are shown one hundred eighty degrees from that shown in FIGS. 1 and 2 but this showing is merely to indicate that the bail may be molded in either half of the mold with the sprue 33 arranged to accommodate the additional injection molding source which is opposite the discharge chute of the molding press.

DESCRIPTION OF THE ALTERNATE EMBODIMENT OF FIGS. 3 AND 4

Figure 3:
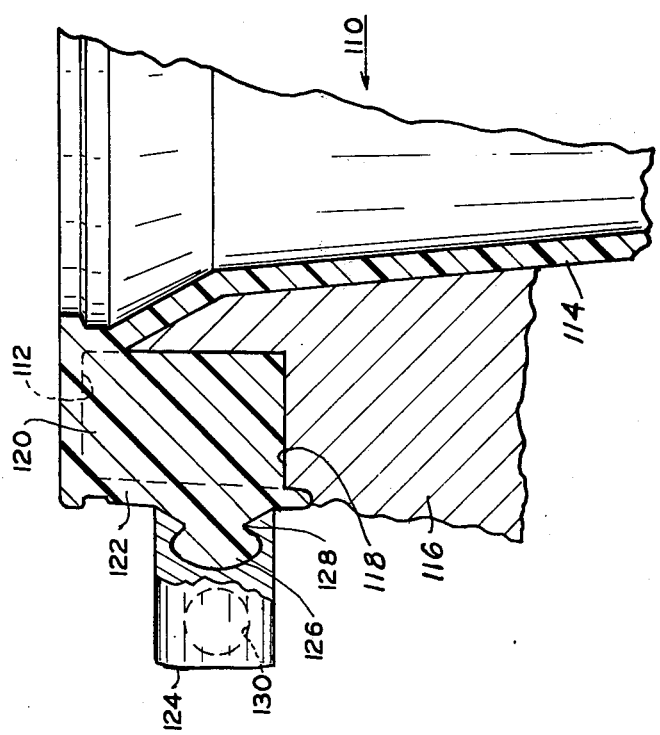
FIG. 3 represents a fragmentary side sectional view of an alternate just-molded container and in particular the relationship of the container to the movable mold pin by which this container is provided with a pair of button-like protuberances.

Referring now to the drawings and FIGS. 3 and 4, there is depicted an alternate to the molded container 10. This alternate container 110 preferably has a reinforced outwardly extending rim portion 112 which is attached to a tapered side wall 114. An inner plug 15, as seen in FIG. 8, in combination with the female or outer portion 116 of the mold, when closed, provides the cavity into which the molten plastic for the container 110 is injected. Locally in the portion 116 is formed a recess portion 118, which when filled provides a block 120 of plastic. This block 120 extends inwardly from a downwardly extending skirt portion 122. This block, in the manner of the block 20 of FIG. 1, may or may not extend inwardly to join the side wall 114 of the container, this being merely a matter of design selection.

A pin member 124 is slidably mounted in the mold 116 and by means such as seen in FIGS. 8 and 9 is movable to three positions of movement. In its inner movement and limit the pin member 124 causes its inner end to be positioned inward of the inner edge of skirt 122. This inner end is shown as having formed therein an ellipsoid-shaped or button-like cavity 126. A reduced shoulder portion 128 in the pin is contemplated to be circular and concentric with the button-like cavity 126. After the container 110 and the included block portion 120 are initially molded the means provided to move the pin 124 outwardly to the position of FIG. 4 is actuated. In doing this a mold passageway 130 from the bail handle cavity, as shown in dashed outline in FIG. 3, is uncovered. This passageway is the termination of a bail-like handle cavity 130, as seen in FIG. 13.

Figure 13:
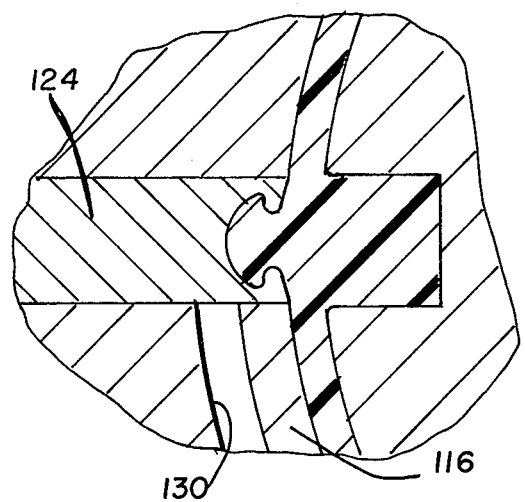
FIG. 13 represents a plan view of the molded pivot of FIG. 3.

With pin 124 now arranged in the mold 116, as in FIGS. 4 and 13, and with the container 110 still in the mold, a plastic bail-like handle 132 of a different plastic is fed from sprue 33 and is formed when molten plastic is caused to flow into the bail cavity 130. The ends of the bail continue from cavity 130 and into that hub portion of mold 116 which has been evacuated by the outward movement of pin 124. This causes the bail-like handle 132 to have a heavy hub portion 134 which is of the size and configuration of pin 124 and encloses the button-like protuberant end 136 which is formed in the cavity 126 in the pin. The button-like protuberant end 136 is uncovered by the outward withdrawal of pin 124. To insure that the end 134 of the bail 132 is not welded or otherwise attached to the protuberant end 136 of plastic around which it is flowed, it is contemplated that the material from which the molded container 110 is made is not compatible with the plastic from which the bail-like handle 132 is made. Prior to ejection of the container and attached pivoted handle, the pin 124 is further moved outwardly to its outer third position which uncovers the protuberant end 136 of the bail hub 134. This, of course, leaves a button-like end 136 on the hub 134 which may or may not be covered by an auxiliary decorative piece not necessarily a part of this molding operation. If desired, this button-like protuberant end 136 may be removed by a secondary operation.

USE AND OPERATION OF THE CONTAINER AND BAIL OF FIGS. 3 AND 4

Although FIGS. 3 and 4 show only one side of the container 110 and a portion of the pivoted bail-like handle 132 it is, of course, to be realized that as in FIG. 8 a complete container 110 has two like or similar protuberant ends 136 formed by like or similar pins 124. These pins and the corresponding button-like protuberant ends 136 are diametrically disposed on the container 110 and the mold 116. The bail-like handle 132 is pivotally secured at both its ends on these protuberant ends 136.

Figure 14:
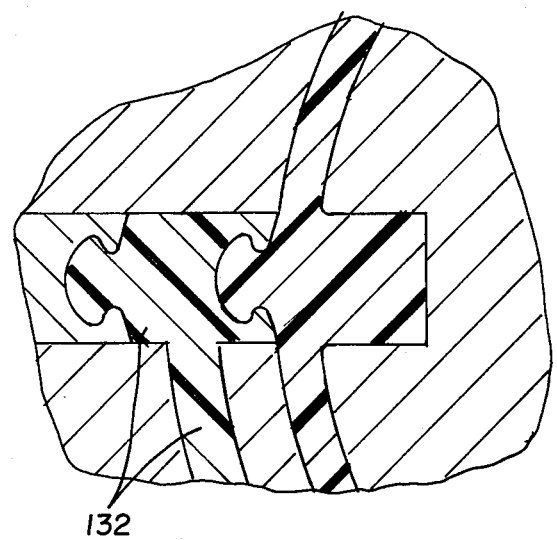
FIG. 14 represents a plan view of the molded pivot of FIG. 4.

It is contemplated that when the container 110 is molded, the mold will be closed and pins 124 will be in the position of FIG. 3. The molten plastic is fed to the container cavity through sprue 35 and at this time block portion 120 and the cavity in pin 124 form protuberant ends 136 on the block 120 to provide the retaining attachment for the molded bail-like handle 132, as seen in FIG. 14.

With the mold still closed and the molded container therein, the pins 124 are moved outwardly from their inner position of FIG. 3 to the position of FIG. 4. The uncovering of mold passageway 130 and the rest of the bail-like handle cavity permits the bail 132 to be molded with plastic from sprue 33. This handle is of molten plastic preferably of another type. The solidifying of the plastic providing this bail-like handle in the mold permits the pins 124 to be further moved outwardly to release the bail from the pins. After the removal of the pins from hub portion 134 the mold is opened as to both container 110 and pivotally attached bail-like handle 132 and this assembled container is removed from the mold.

It is to be noted that pin 124 may be round or have other cross-sectional configurations. The ellipsoid shape of end 136 need not be provided but may be also spherical or any other shape which permits rotational movement of the bail end around the end 136. The block 120 which forms the support for protuberant ends 136 may be of any configuration which provides the desired support and thickness for supporting the end 136.

As with the container of FIGS. 1 and 2, the container of FIGS. 3 and 4 is preferably an injected molded container, however, a blow molded container may be formed in the mold 116. Pins 124 may be used to form the outwardly extending button-like protuberant attachments 136. Around these attachment ends 136 the ends of the bail 132 are molded, as above-described.

DESCRIPTION OF THE ALTERNATE EMBODIMENT OF FIGS. 5, 6 AND 7

Referring next to the drawings and FIGS. 5, 6 and 7, there is depicted an alternate to the molded container 110 of FIGS. 3 and 4. This alternate container 210 preferably has a reinforced outwardly extending rim portion 212 which is attached to a tapered side wall 214. An inner plug 15, as in FIG. 8, in combination with the female or outer portion 216 of the mold, when closed, provides the cavity into which the molten plastic for the container 210 is injected. Locally in the portion 216 is formed a recess portion 218 which, when filled, provides a block 220 of plastic. This block 220 extends inwardly from a downwardly extending skirt portion 222. This block, which corresponds to the block 20 of FIG. 1, may or may not extend to join the side wall 214 of the container, this being merely a matter of design preference.

Figure 15:
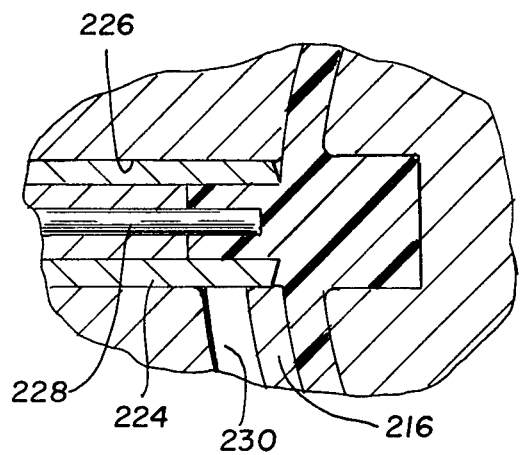
FIG. 15 represents a plan view of the molded pivoted of FIG. 5.

A pin member 224 is slidably mounted in the mold 216 and by means such as cylinder 25 in FIGS. 8 and 9 is movable to three positions of movement. In its inner movement and limit the pin member 224 causes its inner end to be positioned at or slightly outward of the inner edge of skirt 222. This inner end is shown as having formed therein a straight bore 226 which is of a determined depth for the molding of a pin-like protuberant attachment 236 which extends outwardly of the block 220. A smaller pin portion 228 is slidably carried in the bore 226 and when the pin 224 is in its inner position the pin 224 causes a circular recess 229 to be formed in the protuberant attachment 236. After the container 210 and the included block portion 220 are initially molded the means provided to move the pin 224 outwardly to the position of FIG. 6 is actuated. In doing this mold passageway 230, shown in dashed outline in FIG. 5 and in plan view in FIG. 15, is uncovered. This passageway is a portion of the bail-like handle cavity such as is shown in FIG. 10.

Figure 16:
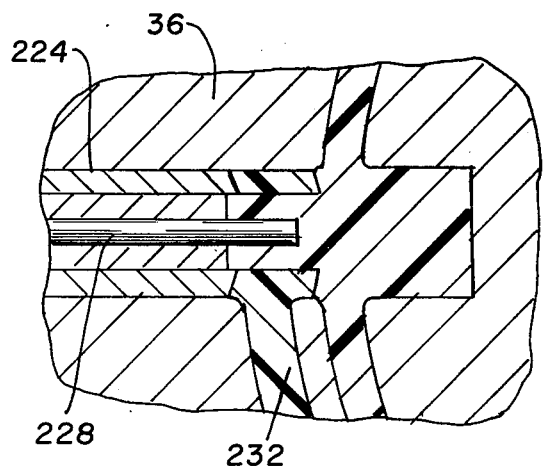
FIG. 16 represents a plan view of the molded pivot of FIG. 6.

With pin 224 now arranged in the mold 216, as in FIGS. 6 and 16, and with the container 210 still in the mold, a plastic bail-like handle 232 preferably of a different and lower temperature plastic is caused to flow in the bail cavity. The flow of molten plastic forming the bail through passageway 230 continues into that portion of mold 216 which has been evacuated by the outward movement of pin 224. This causes the bail-like handle 232 to form a heavy strap-like loop end 234 which is of the outer size and shape of pin 224 and encloses the pin-like protuberant end 236. As the pin-like protuberant end 236 is uncovered by the outward withdrawal of pin 224 the pin 228 is moved only a portion of the total distance so that pin 228 remains in and closes the outer end of the recess 229 during molding of the bail. To insure that the bail is not welded or otherwise attached to the protuberant end 236 of plastic around which it is flowed, it is contemplated that the material from which the molded container 210 is made is not compatible with the plastic from which the bail-like handle 232 is made. Prior to ejection of the container and attached handle, the pin 224 and retained smaller pin 228 are further moved outwardly to their outer third position which disengages the pin 228 from pin-like end 226. This, of course, leaves a small recess 229 in member 226 which may or may not be covered by an auxiliary decorative piece not necessarily a part of this molding operation.

Figure 17:
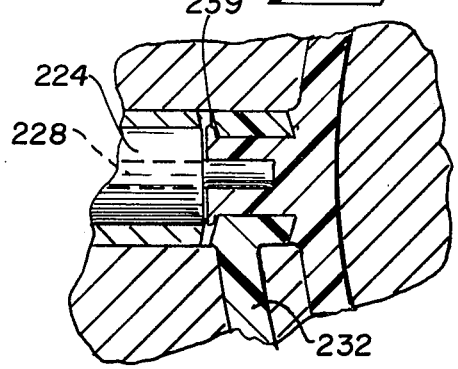
FIG. 17 represents a plan view of the molded pivot of FIG. 7.

As seen in FIG. 17, after the bail 232 has been molded and while still relatively soft, the pin portion 224 may be pushed inwardly slightly to cause an upsetting of the end 236 and a rivet portion 239 to be formed. An expansion of the recess may also be made by auxiliary means with the resulting configuration of FIG. 7.

USE AND OPERATION OF THE CONTAINER AND BAIL OF FIGS. 5, 6 AND 7

Although FIGS. 5 and 6 show only one side of the container 210 and a portion of the pivoted bail-like handle 232 it is, of course, to be realized that as in FIG.

8 there is provided a complete container 210 having two like or similar protuberant ends 226 formed by like or similar pins 224. These pins and the corresponding pin-like protuberant ends are diametrically disposed on the container 210 and the mold 216. The bail-like handle 232 is pivotally secured at both its ends on these protuberant ends 226.

It is contemplated that when the pail 210 is molded, the mold will be closed and pins 224 will be in the position of FIG. 5. Through sprue 35 leading to the container cavity the molten plastic is fed and at this time, block portion 220 and the cavity in pin 224 form protuberant end 236 on the block 220 to form the pin-like attachment for the molded bail-like handle 232.

With the mold still closed and the molded container therein the pins 224 are moved outwardly from their inner position of FIG. 5 to the position of FIGS. 6 and 16. The pin 228 is moved outwardly less than the travel of pin 224 so that the end of pin 228 still remains in the recess 229 to the extent it plugs the end of the recess. The uncovering of mold passageway 230 and the rest of the bail-like handle cavity permits the bail to be molded. This handle cavity is fed molten plastic preferably of another type and from another source and through sprue 33 as shown in FIG. 8. The solidifying of the plastic providing this bail-like handle in the mold permits the pins 224 to be further moved outwardly to release the bail from the pins. After the removal of the pins from hub portion 234 the mold is opened as to both container and pivotally attached bail-like handle and this assembled container is removed from the mold.

In addition to the riveting action shown in FIG. 17, it is contemplated that an alternate securing method might include the forming of the bail end 234 around the pin 236 and the recess 229 may have its outside plugged and supported by the incompletely removed pin 228. The heat from the molten mass then causes a small collapse of the pin 236 toward the recess so that as in FIG. 7 the result is a slightly concave journal of the pin member 236 and although this is only a few thousandths of an inch it is sufficient to rotatably retain the end 234 on the pin-like extension 236.

If desired, a cap piece may be inserted in the recess 229 to cover this recess. Other means may be used to form a retaining means on pin 236. As noted in the embodiments of FIGS. 1 and 3, this embodiment of FIG. 5 may use a blow molded container to which is attached the molded bail handle.

In defining the several mold components and the resulting molded product it is to be noted that: (a) the container need not have an outwardly extending rim and even if one is provided the socket recesses from the local block portions molded as part of and extending outwardly from the side wall; (b) in FIG. 1, the inner end 26 of the movable pin 24 is enlarged from the reduced diameter 28 by whatever amount can be withdrawn through the just formed outer wall of the socket. This inner end 26, no matter its shape, has its outer surface concentric to the axis of rotation of hub 34 of the bail 32; (c) in FIG. 1 the shape of the connection portion 32 of the hub 34 of the bail-like handle is merely a matter of selection with the strength of the bail-like handle being sufficient to accept the expected load.

In the alternate embodiment depicted in FIGS. 3 and 4, the formed protuberant end 136 has its larger shape adapted to be withdrawn from the outwardly moved pin 124. This formed end 136, no matter what its shape may be, provides a concentric form around which the hub 134 is molded. As in FIG. 1, the protuberance 136 and the hub 134 are designed with the strength of the plastic material and load on the handle as the factors establishing the final configuration.

In the alternate embodiment shown in FIGS. 5, 6 and 7, the protuberant end 236 is formed as a straight short pin which extends outwardly to provide the extension around which the hub end is molded. This strap-like mounting provides only rotational motion of the hub around the pin extension.

As a method for molding a container and a rotatably secured bail-like handle whose ends are molded around mating portions formed on the exterior surface of said container to provide a rotatably secured attachment of the handle to the container, the present invention includes the steps of: forming a mold having complementary male and female components which when closed provides a cavity for the molding therein of a container; forming a pair of shaped recesses in the female portion of the mold and positioning said recesses so that when the container is molded these recesses form a pair of diametrically opposed portions integrally attached to the outer portion of the container; forming a pair of opposed guideways in the female mold portion and slidably carrying in each of said guideways a movable pin with each pin having its inner end formed to provide a fixed member portion of a molded-in-place rotatable connection of the container; moving each of the pins to at least three selected positions and maintaining each of these positions during and until an associated molding step is completed, the first position requiring the moving of each of the pins until the inner end of the pin is positioned within the locally formed recess and at this position retaining the pins as and until plastic is flowed in the closed mold to form the molded container; forming a bail-like cavity in the female portion of the mold and providing a sprue to this cavity, this sprue connecting to a source of molten plastic; moving each of the movable pins to a second position after molding the container, this moving of the pins to the second position being sufficient to uncover the fixed member portion of the container and form a mold recess for the hub of a bail and also to uncover a passageway from the bail-like handle cavity to and into the molded recess, the ends of the positioned pins providing an outer wall closing of the handle hub cavity; injecting a determined amount of molten plastic into the handle cavity and from this cavity into a passageway at the ends of the bail-like handle into the mating portions for the rotatable attachment of the handle provided on the plastic container to form the rotatably secured hub of the bail-like handle as and while the molded container is still in the mold; moving each of the pins further to a third position, which position is sufficient to release the inner ends of the movable pins from engagement with the just formed hub while the attached bail-like handle is still in the mold, and opening the mold and removing the container and attached bail-like handle from the mold.

Terms such as "left," "right," "up," "down," "bottom," "top," "front," "back," "in," "out" and the like are applicable to the embodiments shown and described in conjunction with the drawings. These terms are merely for the purpose of description and do not necessarily apply to the position in which the mold and bailed plastic container formed thereby may be constructed or used.

While a particular embodiment of the mold and container and an alternate embodiment thereof have been shown and described it is to be understood the construction and method of use is not limited thereto and protection is sought to the broadest extent the prior art allows.

What is claimed is:

1. The method of molding a container and a rotably secured bail handle whose ends are molded around mating portions formed on the exterior surface of said container to provide a rotatably secured attachment of the handle to the container, the steps of molding including:
   a. forming a mold having complementary male and female components which when closed provides a cavity for the molding therein of a container;
   b. forming a pair of shaped recesses in the female portion of the mold and positioning said recesses so that when the container is molded these recesses form a pair of diametrically opposed portions integrally attached to the outer portion of the container;
   c. forming a pair of opposed guideways in the female mold portion and slidably carrying in each of said guideways a movable pin with each pin having an inner end formed to provide a fixed member portion of a molded-in place rotatable connection of the container;
   d. said female component of the mold having a bail handle forming cavity and a sprue connecting said bail handle forming cavity to a source of molten plastic;
   e. sequently moving each of the pins to at least three selected positions and maintaining each of these positions during a molding step and until said molding step is completed, the first position requiring the moving of each of the pins until the inner end of each pin is positioned within one of said recesses and at this position retaining the pins as and until plastic is flowed in the closed mold to form the molded container;
   f. after molding the container moving of the pins to the second position being sufficient to uncover the fixed member portions of the container and form mold recesses for the hubs of a bail and also to uncover a passageway from the bail forming cavity to and into each of the bail hub mold recesses, the ends of the positioned pins providing outer walls closing the handle hub cavities;
   g. injecting a determined amount of molten plastic into the handle cavity and from this cavity into the passageways at the ends of the bail handle forming cavity and into mating portions for the rotatable attachment of the handle provided on the plastic container to form rotatably secured hubs of the bail handle the molded container is still in the mold;
   h. moving each of the pins further to a third position, which position is sufficient to release the inner ends of the movable pins from engagement with the just formed hubs while the attached bail handle is still in the mold, and
   i. opening the mold and removing the container and attached bail handle from the mold, the materials of said container and said handle being incompatible.

2. The method of molding a container and handle as in claim 1 in which the pins are formed with their inner ends having a reduced diameter portion established at a determined distance from the distal portion of the inner end and inwardly from this reduced diameter portion increasing the diameter of portions of this inner end, said end being shaped so that any cross section of the inner end normal to an axis of the pin has a substantially circular configuration.

3. The method of molding a container and handle as in claim 2 in which the forming of the pins includes forming the inner end of the pin with an ellipsoid shape.

4. The method of molding a container and handle as in claim 1 which includes forming the mold so that the container will have an outwardly extending rim and a skirt portion attached thereto and with the shaped recess carried in the mold being shaped and positioned to produce a block-like member attached to the skirt portion.

5. The method of molding a container and handle as in claim 4 in which the movable pin is formed with a reduced diameter portion and when the movable pin is at the first position this reduced diameter on the pin coincides with the outer skirt of the container rim.

6. The method of molding a container and handle as in claim 1 in which the molding of the container is by injection molding with molten plastic having a higher melting point than the molten plastic used in the bail-like handle.

7. The method of molding a container and handle as in claim 1 which includes forming the pin with a determined size which is sufficiently larger than a reduced diameter portion also formed therein to produce a molded bail-like handle in which the hub has an enlarged portion rotatably retained in a socket formed in a block-like member of the container.

8. The method of molding a container and handle as in claim 7 which includes positioning of the pins so that the hubs of the handle are molded with their axis of rotation substantially in coincidence.

9. The method of molding a container and handle as in claim 1 which further includes the step of forming the inner end of each pin with a reduced diameter aperture which opens inwardly into the pin to provide a button-like cavity, said pin in its inner position forming a button-like protuberance on a block-like member and around this protuberance the hub of the bail-like handle is formed when the pin is in second position.

10. The method of molding a container and handle as in claim 9 which includes forming the pin with an enlarged diameter to provide a hub on the molded bail, which hub is larger than the button-like protuberance.

11. The method of molding a container and handle as in claim 1 which further includes the step of forming the inner end of each movable pin with a cylindrical recess which produces on the molded container a pin-like protuberant end around which the end of the bail is formed.

12. The method of molding a container and handle as in claim 11 which further includes forming the movable pin so as to include a second and smaller solid pin which extends into the cylindrical recess, said second pin resulting in an axial recess being formed in the pin-like protuberant end formed as the container is molded.

13. The method of molding a container and handle as in claim 12 which further includes the step of mounting the second smaller pin so as to be slidably retained within the movable pin and during the moving of the movable pin from its first position to its second position for molding the bail-like handle, said smaller pin is moved a lesser extent so that this smaller pin closes the opening into the axial recess of the straight-pin extension during the molding of the bail-like handle.

14. The method of molding a container and handle as in claim 13 which further includes the step of moving the smaller pin outwardly with the movable pin as it is moved to its third position so as to disengage both pins from the straight-pin extension as the mold is opened for removal of the container and secured handle.

* * * * *